United States Patent [19]

Yamamoto

[11] 4,177,578

[45] Dec. 11, 1979

[54] MULTI-PAGE PROBLEM AND ANSWER WORKBOOK

[76] Inventor: Takeshi Yamamoto, Fujinodai-Danchi 1-20-106, Honmachida 3486, Machida-shi, Tokyo, Japan

[21] Appl. No.: 866,399

[22] Filed: Dec. 30, 1977

[30] Foreign Application Priority Data

Mar. 2, 1977 [JP] Japan .......................... 52/23876[U]

[51] Int. Cl.$^2$ ............................................ G09B 3/02
[52] U.S. Cl. .................................. 35/9 R; 35/31 R; 35/35 R; 35/48 A
[58] Field of Search .............. 35/9 R, 9 E, 9 F, 31 R, 35/31 F, 35 R, 35 E, 48 A

[56] References Cited

U.S. PATENT DOCUMENTS

| 2,497,200 | 2/1950 | Appel | 35/48 A X |
| 2,835,989 | 5/1958 | Arrowsmith et al. | 35/48 A |

FOREIGN PATENT DOCUMENTS

| 252785 | 10/1948 | Switzerland | 35/35 E |
| 100989 | 8/1916 | United Kingdom | 35/35 E |

*Primary Examiner*—William H. Grieb
*Attorney, Agent, or Firm*—Wenderoth, Lind & Ponack

[57] ABSTRACT

A workbook is provided for the study of preparing not only an expected answer from a given problem but also an expected problem from a given answer. This workbook comprises a first page provided with a problem section and an adjacent expected answer guide section, adjacent to each other, a transparent second page superimposable upon the first page, and an opaque sheet adapted to be inserted between the first and second pages. The second page is provided with an answer section, and an expected problem guide section both of which are respectively located at corresponding positions above the expected answer guide section and the problem section when the second page is superimposed upon the first page.

6 Claims, 6 Drawing Figures

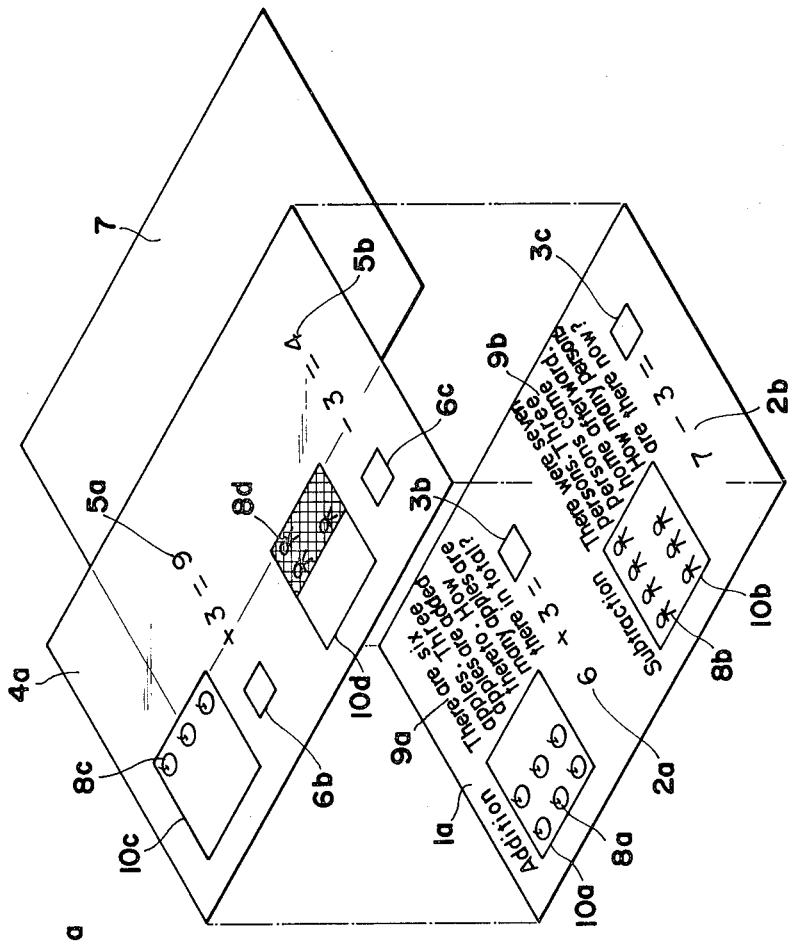

MULTI-PAGE PROBLEM AND ANSWER WORKBOOK

BACKGROUND OF THE INVENTION

This invention relates to a workbook suited for the study of school subjects such as arithmetic, national language and foreign languages.

In a known workbook of this type, expected answer sections for given problems are left as blanks or are hidden to be unreadable in by a special manner such that the answer can be made to appear by a special adjustment when desired. That is to say, in such workbook attention has been paid only to how to hide the answer sections and how to effectively cause the answers to appear.

However, in the study of many school subjects, it is known to be effective not only to prepare an expected answer from the given problem, but also to prepare the problem from the given answer. For example, in case of the study of English words by a Japanese student, it is effective to learn the Japanese meaning from an English word with the latter being the problem and also to learn the English word from the Japanese meaning with the latter being problem. Likewise, in case of the study of the four rules of arithmetic, it is effective to calculate not only an expected answer from the given two numerals constituting the problem but also to calculate one numeral of the problem from the other numeral of the problem and the given numeral of the answer.

Notwithstanding the above-mentioned study effect of preparing an expected answer from the given problem and also the problem from the given answer, the known workbook set forth above has been adapted only for the study of preparing the expected answer from the given problem, so that above discussed higher study effect could not be achieved.

SUMMARY OF THE INVENTION

Accordingly, an object of the present invention is to provide a workbook suited for the study of preparing an expected answer from a given problem section and, reversely, an expected problem from a given answer section.

Another object of the present invention is to provide a workbook of the type set forth above wherein the correct answer to the given problem section and the correct problem to the given answer section may be made quite easily when desired.

Still another object of the present invention is to provide a workbook suited for the study of language.

A further object of the present invention is to provide a workbook suited for the study of the four arithmetic rules.

A workbook according to the present invention comprises a first page, a transparent second page superimposable upon the first page, and an opaque sheet adapted to be inserted between the first and second pages. The first page is provided with a problem section and an adjacent expected answer guide section. The second page is provided with an answer section and an expected problem guide section, both of which are respectively located at corresponding positions above the expected answer guide section and the problem section when the second page is superimposed upon the first page.

Preferably, the expected answer guide section on the first page comprises a frame or brackets adapted to visually enclose the answer section on the second page when the second page is superimposed upon the first page. Likewise, the expected problem guide section on the second page comprises a frame or brackets adapted to visually enclose the problem section on the first page when the second page is superimposed upon the first page.

In the workbook adapted to the study of language, the problem section on the first page is composed of the foreign language, and the answer section on the second page is composed of other or national language.

BRIEF DESCRIPTION OF THE DRAWINGS

Other objects and features of the present invention will become apparent from the following detailed description of preferred embodiments thereof when taken in conjunction with the accompanying drawings, in which:

FIG. 3 is a perspective view showing a workbook including separated pages for the study of arithmetic addition and subtraction according to a second embodiment of the present invention, FIG. 4 is a plan view showing the workbook in FIG. 3 with one page thereof being superimposed upon the other page.

DETAILED DESCRIPTION OF THE INVENTION

Figure 1:
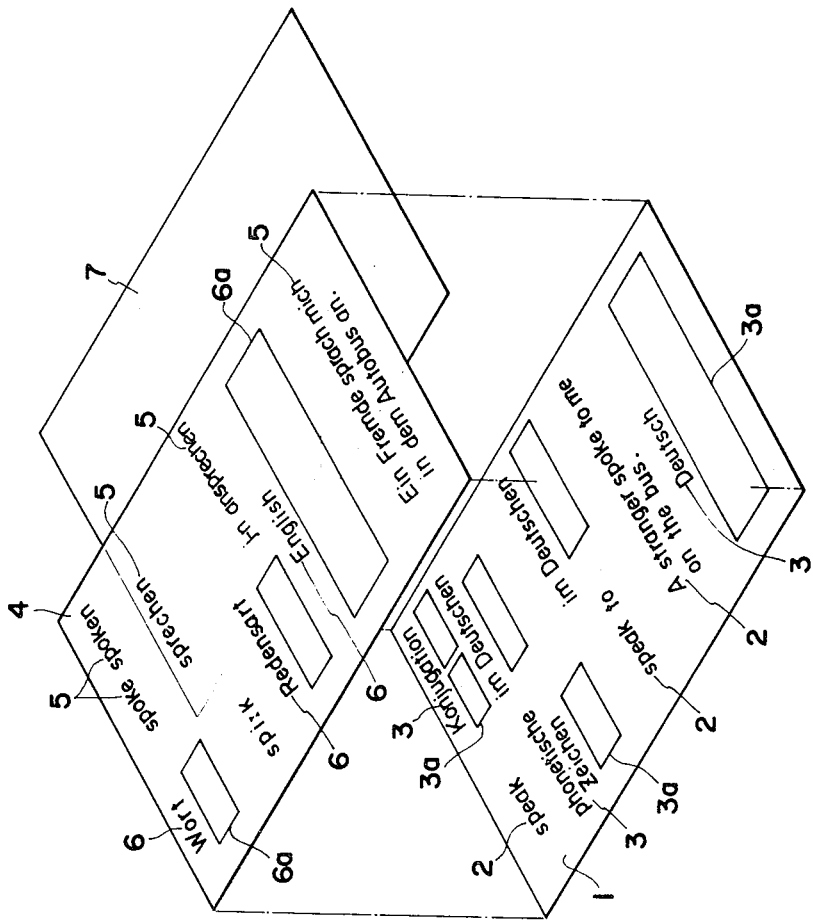
FIG. 1 is a perspective view showing a workbook including separated pages for the study of language according to a first embodiment of the present invention.
Figure 2:
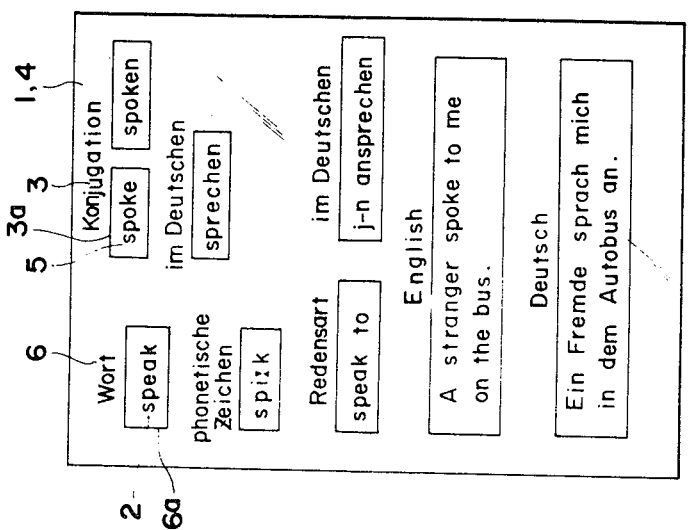
FIG. 2 is a plan view showing the workbook in FIG. 1 with one page thereof being superimposed upon the other page.

Referring to a first embodiment of the present invention shown in FIGS. 1 and 2, a workbook is provided for the study of English and also of English to German. The workbook comprises an opaque first page 1 which is generally white coloured. The first page 1 is printed at the left upper part thereof with an English verb "speak", which constitutes a problem section 2 as will be understood hereinafter. Rightwardly adjacent to the verb, expected answer guide sections comprising German words 3 and rectangular blank frames 3a are provided by printing. These German words 3 lead a student to answer the conjugation of the past and perfect tenses of the English verb "speak" into the frame 3a and also lead the student to answer the German verb corresponding to English verb "speak" into the frame 3a. Also provided downwardly adjacent to the English verb "speak" is an expected answer guide section 3 and 3a for leading the student to answer the phonetic symbols of the English verb "speak" into the frame 3a. Thus, the English verb "speak" constitutes a problem section for expected answers, i.e. conjugation, German verb and phonetic symbols of the English verb "speak".

Provided at the middle part of the first page 1 is a printed idiomatic phrase of English "speak to" which constitutes the problem section 2. An expected answer guide section 3 and 3a is provided adjacent to the English words to lead the student to answer the German words corresponding to the English words "speak to" into the frame 3a.

Also provided at the lower part of the first page 1 is an English sentence which constitutes a problem section 2, to which a German sentence is to be answered into the frame 3a at the lower answer guide section.

A second page 4 is provided above the first page 1 to be superimposed upon the latter. This second page 4 is made of a transparent sheet such as a plastic sheet or film, a cellophane sheet or the like, and is bound with the first page at one marginal portion thereof. The second page 4 has printed answer sections 5 each of which constitutes answers to the problems of the problem sections 2 on the first page. These answer sections 5 are located in such a manner that these answers are visually enclosed by the frames 3a of the corresponding answer guide sections on the first page 1.

Also provided on the second page by printing are expected problem guide sections each of which comprises a guide word or words 6 and a blank frame 6a. The frames 6a on the second page 4 are provided to visually enclose the problem section 2 on the first page 1 when the second page 4 is superimposed upon the first page.

To study the foreign language by this workbook, the student opening the first page 1 can try to answer the past and perfect tenses from the present tense of the verb "speak", the German verb corresponding to the English verb "speak", and the phonetic symbols of the verb "speak" into the corresponding frames 3a without looking at the respective answers thereof. Likewise, the student can try to answer the German words and sentence from the English words "speak to" and "A stranger spoke to me on the bus." into the corresponding frames on the first page.

Further, by inserting an opaque sheet 7 between the first and second pages, the student can study the foreign language by the second page 4. That is, the student can try to prepare the present tense of the verb from the past and perfect tenses thereof, and also from the German verb and the phonetic symbols thereof, into the corresponding frame 6a on the second page. Likewise, the student can try to prepare English words or the idiomatic phrase and the English sentence into the corresponding frames 6a—6a from German words and sentence, respectively.

When the opaque sheet 7 is removed from between the first and second pages to directly superimpose the transparent second page 4 upon the first page 1 as shown in FIG. 2, the answers for the problems 3 on the first page visually appear in the respective corresponding frames 3a on the first page 1, since the second page 4 is transparent and since the answer sections 5 on the second page 4 are located to be enclosed by the frames 3a on the first page 1. Also, the problems 2 on the first page 1 visually appear in the corresponding frames 6a on the second page 4. Thus, the student can visually check whether the answers 4 and problems 2 prepared by him into the frames 3a and 6a on the first page 1 and the second page 4, respectively, were correct.

As will be understood from the disclosure set forth above, the present workbook allows the student to study the language in three ways, i.e. by using the first page, by using the second page, and by superimposing the second page upon the first page. Thus, the present workbook can remarkably enhance the study effect by allowing the student to study from problems to answers and, reversely, from answers to problems.

FIGS. 3 and 4 show another embodiment of the present workbook adapted to the study or arithmetic addition and subtraction. In this second embodiment, the opaque first page 1a is printed at the upper part thereof with a formularized problem 2a of addition and at the lower part thereof with a formularized problem 2b of subtraction. The answers to each of the formularized problems are to be made in blanks, and frames 3b and 3c are provided or printed as expected answer guide sections. Preferably, to make it easy to understand the concepts of addition and subtraction for study by an infant, FIGS. 8a and 8b and sentences 9a and 9b are shown on the first page 1a adjacent to the formularized problems 2a and 2b. The FIG. 8a for the addition problem show six apples, the number of which corresponds to the numeral at the left term of the formularized problem 2a of addition. Likewise, the FIG. 8b for the subtraction problem shows seven persons, the number of which corresponds to the numeral at the left term of the formularized problem 2b of subtraction. These FIGS. 8a and 8b are shown in frames 10a and 10b, respectively, with the FIG. 8a for the addition being shown at the left part to the frame 10a.

A second page 4a provided to be superimposable upon the first page 1a is made of a transparent sheet and, preferably, is bound with the first page 1a at one end thereof. The second page 4a is printed with answer sections 5a and 5b, which show answer numerals for the formularized problems 2a and 2b on the first page 1a and which are located so as to be visually enclosed by the frames 3b and 3c on the first page 1a, respectively, when the second page is superimposed thereon. Also, the second page 4a is printed with the right term of each of the formularized problems 2a and 2b shown on the first page 1a, while the left terms thereof are left as blanks and enclosed by frames 6b and 6c, which function as expected problem guide sections. The printed right terms on the second page 4a are made to be accurately registered with the corresponding right terms of the formularized problems 2a and 2b on the first page when the second page is superimposed upon the first page. The frames 6b and 6c on the second page 4a are provided to visually enclose the left terms of the formularized problems on the first page when the second page is superimposed upon the first page.

The second page 4a is further printed with FIGS. 8c and 8d of the same kinds as those of 8a and 8b, respectively on the first page. The FIG. 8c at the upper part of the second page 4a shows three apples at the right side portion in a frame 10c, the number of which corresponds to the right term of the formularized problem of addition. The FIG. 8c is arranged not to be overlapped with the FIG. 8a on the first page when the second page 4a is superimposed upon the first page 1a. Likewise, the FIG. 8d at the lower part of the second page 4a shows three persons at the right side portion in a frame 10d, the number of which corresponds to the right term of the formularized problem of subtraction. The FIG. 8d is shaded by cross lines and is arranged to be accurately overlapped or registered with parts of the FIG. 8b on the first page when the second page is superimposed upon the first page.

To study arithmetic addition and subtraction, the student or infant first opening the first page 1a can try to prepare answers to the formularized problems 2a and 2b into the blank frames 3b and 3c with reference to the sentences 9a and 9b and FIGS. 8a and 8b, respectively. Also, by inserting an opaque sheet 7 between the first and second pages, the infant can try to fill the blank frames 6b and 6c on the second page 4a by reversely calculating the arithmetic problems from the given answers 5a and 5b, respectively.

When the opaque sheet 7 is removed so as to superimpose the second page upon the first page, all of the blank spaces in the frames 3b, 3c, 6b and 6c of the formularized problems and answers are visually filled with the correct numerals as shown in FIG. 4, so that the student or infant can visually check whether the numerals filled by him into the frames 3b, 3c,6b and 6c on both pages were correct as shown in FIG. 4. Also, the FIGS. 8a and 8c for the addition become cumulative and visually show the answer of the arithmetic problem 2a of addition. The FIG. 8b on the first page for the subtraction is partially shaded by cross lines and visually shows the answer of the arithmetic problem 2b of subtraction.

Thus, the infant can clearly understand the concepts of arithmetic addition and subtraction.

Figures 5, 6:
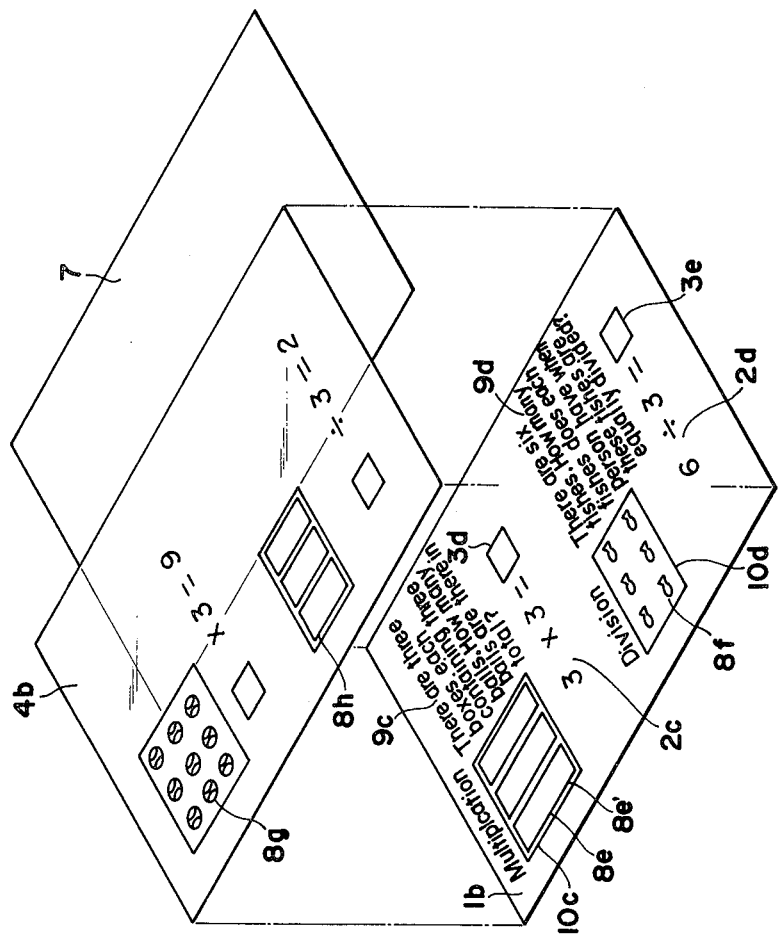
FIG. 5 is a perspective view showing a workbook including separated pages for the study of arithmetic multiplication and division according to a third embodiment of the present invention.
FIG. 6 is a plan view showing the workbook in FIG. 5 with one page thereof being superimposed upon the other page.

FIGS. 5 and 6 show a third embodiment of the present workbook adapted to the study of arithmetic multiplication and division. In this third embodiment, the opaque first page 1b is printed at the upper part thereof with a formularized problem 2c of multiplication and at the lower part thereof with a formularized problem 2d of division. The answers to each of the formularized problems are made in blanks with enclosing frames 3d and 3e which function as expected answer guide sections. As in the case of the second embodiment, in order to make it easy to understand the concepts of multiplication and division for study by an infant, FIGS. 8e and 8f and sentences 9c and 9d are shown on the first page 1b adjacent to the formularized problems 2c and 2d, respectively. The FIG. 8e for the multiplication problem comprises small three frames 8e' in a large frame 10c, the number of which corresponds to the left term of the formularized problem 2c of the multiplication. The FIG. 8f for the division problem comprises six fishes in a frame 10d, the number of which corresponds to the left term of the formularized problem 2d.

A second page 4b provided to be superimposable upon the first page 1b is made of transparent sheet and, preferably, is bound with the first page at one end thereof. The second page 4b is printed with answer sections and with the right terms of the formularized problems as in the case of the second embodiment. Also printed on the second page 4b are FIGS. 8g and 8h which are helpful to the understanding of multiplication and division. The FIG. 8g for the multiplication problem shows nine balls, the number of which is equal to the numeral of the answer of the formularized problem 2c, and every three balls thereof are arranged to be visually enclosed by one of the small frames 8e' on the first page when the second page is superimposed upon the first page. The FIG. 8h for the division problem shows three small frames, the number of which corresponds to the number of the right term of the formularized problem 2d,and each small frame is arranged to visually enclose two fishes on the first page 1b when the second page is superimposed upon the first page.

Although it is not shown in FIGS. 5 and 6, it is preferable to provide or print sentences on the second page 4b, which are helpful to reversely calculate each of the multiplication and division problem from the answer thereof and which are also helpful to fill a correct numeral into the frame of the problem section on the second page 4b. Such sentence on the second page for the multiplication problem may be such as "There are nine balls. How many balls are there in each box when all of these balls are equally divided into three boxes?". Such sentence for the division problem may be such as "There are two fishes in each of the three frames. How many fishes are there in total?". In case such sentences are provided on the second page, then they should be provided so as not to be overlapped with the sentences, figures or numerals on the first page.

The arithmetic multiplication and division according to the third embodiment may be studied in the same manners as disclosed in the first and second embodiments. That is, the student can respectively study from the first page 1b, from the second page 4b, and by superimposing the second page upon the first page.

Although the present invention has been disclosed with reference to preferred embodiments thereof, many modifications and alterations may be made thereto within the scope of the present invention. For example, although only one transparent second page is used in these embodiments of the present invention, two or more transparent pages may be used, in which case the answer to the problem on the first page is made to visually appear when all of the transparent pages are laminated and superimposed upon the first page. Of course, in this case, each transparent page has to independently be provided with an expected problem guide section which allows the student to reversely study from the given answer. What is claimed is:

1. A multi-page problem and answer workbook comprising:
    a first page having thereon a problem section setting forth a problem to be answered and an adjacent expected answer guide section on which a student may place an expected answer to said problem;
    a transparent second page superimposable over said first page, said second page having thereon an answer section setting forth the correct answer to said problem of said problem section on said first page and an adjacent expected problem guide section on which the student may place an expected problem which is correctly answered by said correct answer;
    said answer section and said expected problem guide section being positioned on said second page such that when said second page is superimposed over said first page said answer section and said expected problem guide section respectively overlie said expected answer guide section and said problem section of said first page and;
    an opaque sheet means, selectively insertable between said first and second pages, for preventing said problem section and said expected answer in said expected answer guide section on said first page from being visible through said second page when said second page is superimposed over said first page;
    whereby said expected answer guide section of said first page comprises means for allowing the student to insert an expected answer to said problem of said problem section by using said first page only, said expected problem guide section of said second page comprises means for allowing the student to insert an expected problem which is answered by said correct answer of said answer section by using said second page only, and said correct answer of said answer section may be compared with said expected answer inserted in said expected answer guide section and said problem in said problem section may be compared with said expected problem inserted into said expected problem guide section when said second page is superimposed over said first page.

2. A workbook as claimed in claim 1, wherein said expected answer guide section on said first page comprises a frame or brackets adapted to visually enclose said answer section on said second page when said second page is superimposed over said first page, and said expected problem guide section on said second page comprises a frame or brackets adapted to visually enclose said problem section on said first page when said second page is superimposed over said first page.

3. A workbook as claimed in claim 1, wherein said workbook is adapted to the study of language, said problem section on said first page is composed of a first language, and said answer section on said second page is composed of a second language.

4. A workbook as claimed in claim 1, wherein said workbook is adapted to the study of the four arithmetic rules, said problem section on said first page comprising at least two numerals forming an arithmetic problem of at least one of said arithmetic rules, said answer section on said second page comprising a numerical answer to said arithmetic problem, and said second page further has thereon, adjacent said numerical answer, at least one of said numerals of said arithmetic problem, said one numeral on said both pages being arranged to be registered with each other when said second page is superimposed over said first page.

5. A workbook as claimed in claim 4, wherein said first page includes a drawing adjacent to said problem section, said drawing having a figure corresponding to one of said numerals of said arithmetic problem, and said second page includes a drawing having a figure corresponding to the other of said numerals of said arithmetic problem on said first page, said figures on both of said pages being adapted to visually illustrate the answer to said arithmetic problem when said second page is superimposed over said first page.

6. A workbook as claimed in claim 1, wherein said first and second pages are bound to each other at one adjacent margin thereof.

* * * * *